United States Patent
Von Koenigsegg (10) Patent No.: US 10,662,687 B2
(45) Date of Patent: May 26, 2020

(54) DOOR HINGE (71) Applicant: KOENIGSEGG AUTOMOTIVE AB, Angelholm (SE)

(72) Inventor: Christian Von Koenigsegg, Vejbystrand (SE)

(73) Assignee: KOENIGSEGG AUTOMOTIVE AB, Angelholm (SE)

( * ) Notice: Subject to any disclaimer, the term of this patent is extended or adjusted under 35 U.S.C. 154(b) by 0 days.

(21) Appl. No.: 16/245,620

(22) Filed: Jan. 11, 2019

(65) Prior Publication Data
US 2019/0218838 A1 Jul. 18, 2019

(30) Foreign Application Priority Data
Jan. 12, 2018 (EP) ..................... 18151453

(51) Int. Cl.
*E05D 3/14* (2006.01)
*B60J 5/04* (2006.01)
*E05D 3/10* (2006.01)

(52) U.S. Cl.
CPC ............ *E05D 3/147* (2013.01); *B60J 5/0472* (2013.01); *E05D 3/10* (2013.01); *E05Y 2201/716* (2013.01); *E05Y 2900/531* (2013.01); *Y10T 16/541* (2015.01); *Y10T 16/5472* (2015.01); *Y10T 16/5476* (2015.01)

(58) Field of Classification Search
CPC .......... E05D 3/147; E05D 3/10; B60J 5/0472; Y10T 16/541; Y10T 16/5472; Y10T 16/5476
USPC .......................................... 16/354, 367, 370
See application file for complete search history.

(56) References Cited

U.S. PATENT DOCUMENTS

| | | | | |
|---|---|---|---|---|
| 3,848,293 A | * | 11/1974 | Marchione | E05D 7/06 16/297 |
| 6,820,918 B1 | * | 11/2004 | DeBono | B60J 5/0472 16/289 |
| 6,845,547 B2 | * | 1/2005 | Ham | B60J 5/0472 16/239 |
| 7,007,346 B2 | * | 3/2006 | Hoffman | B60J 5/0472 16/294 |
| 7,048,322 B2 | * | 5/2006 | DeBono | B60J 5/0472 16/289 |
| 7,059,655 B2 | * | 6/2006 | Ham | B60J 5/0472 296/146.11 |
| 7,140,075 B2 | * | 11/2006 | Ham | B60J 5/0472 16/374 |

(Continued)

FOREIGN PATENT DOCUMENTS

DE 202015007818 2/2017

OTHER PUBLICATIONS

Search Report from European Patent Office on co-pending EP application (18151453.0) dated Jul. 23, 2018.

*Primary Examiner* — Jeffrey O'Brien
(74) *Attorney, Agent, or Firm* — Klein, O'Neill & Singh, LLP (57) ABSTRACT

A door hinge is attached by a base to a road vehicle. The door hinge carries a side door via a door mount, and it enables the door, when it is being opened, to be shifted upwards while at the same time shifting in an outward direction and rotating in a plane that is transverse to the outward direction. This decreases the risk of a lowermost parts of the side door hitting, e.g., a roadside curb near which the road vehicle is parked.

25 Claims, 5 Drawing Sheets

(56) References Cited

U.S. PATENT DOCUMENTS

| | | | | |
|---|---|---|---|---|
| 7,210,200 B2* | 5/2007 | Hoffman | ............... | B60J 5/0472 |
| | | | | 16/367 |
| 7,347,483 B2* | 3/2008 | De Bono | ............... | B60J 5/0472 |
| | | | | 296/146.12 |
| 7,805,810 B2* | 10/2010 | Hoffman | ............... | E05D 3/127 |
| | | | | 16/354 |
| 7,832,057 B2* | 11/2010 | Hoffman | ............... | E05D 3/06 |
| | | | | 16/287 |
| 8,151,417 B1* | 4/2012 | Ham | ............... | E05D 3/10 |
| | | | | 16/239 |
| 10,422,170 B2* | 9/2019 | Trentin | ............... | E05D 3/10 |
| 2004/0256882 A1* | 12/2004 | McRobert | ............ | B60J 5/0472 |
| | | | | 296/146.11 |
| 2006/0123592 A1* | 6/2006 | Yip | ............... | E05D 3/10 |
| | | | | 16/241 |
| 2007/0013208 A1* | 1/2007 | Krumholz | ............... | E05D 3/10 |
| | | | | 296/146.12 |
| 2007/0245525 A1* | 10/2007 | Hoffman | ............... | E05D 15/00 |
| | | | | 16/367 |
| 2008/0083090 A1 | 4/2008 | Hoffman | | |

* cited by examiner

DOOR HINGE

CROSS REFERENCE TO RELATED APPLICATION

This application claims priority, under 35 U.S.C. Section 119, from European Application No. 18151453.0, file Jan. 12, 2018, the disclosure of which is incorporated herein by reference in its entirety.

FEDERALLY SPONSORED RESEARCH OR DEVELOPMENT

Not applicable.

TECHNICAL FIELD

Embodiments herein relate to a door hinge for connecting a side door of a road vehicle to the body of the road vehicle.

BACKGROUND

Road vehicles come in various forms and sizes. Although the general character is that of a body and four wheels, features such as length, height and width together with such details as the type and placement of doors vary to a large extent among the road vehicles. For example, road vehicles that may be designated as station wagons or sport utility vehicles (SUV) are relatively large and are of significant height in order to accommodate a plurality of passengers and bulky items such as baggage. The typical configuration of such road vehicles is also such that the side doors are arranged at a height above the ground upon which the vehicle is parked that they can swing out without risk of hitting a curb when the road vehicle is parked along a street that is lined by a curb or similar lining.

On the other hand, a typical sports car is, in contrast to a station wagon or SUV, a low riding vehicle having a high power engine. A sport car is also, needless to say, typically very expensive both in terms of initial cost of purchase but also expensive in terms of service and, in particular, cost of repairing a damaged part of the car. Hence, the particular fact that a sports car is low riding has a direct impact on the risk of a side door being damaged by hitting a curb when the door is opened and swings out, with the subsequent expensive repairs.

The risk of damaging a passenger door of a sports car has been recognized, since long and various attempts have been made in order to reduce such a risk. One example of such attempts is that some sports cars have been configured with side doors that, during a procedure of opening the door, the door swings out from the body of the car a very limited distance before rotating around an axis that is essentially perpendicular to the plane of the door. Such a door is connected to the body of the vehicle by means of a single door hinge that allows transverse movement in combination with rotational movement of the door, that provide a reduced risk of damaging the door by hitting a curb by the side of which the vehicle is parked. However, sports car development is such that there is an ever increasing desire to provide vehicles having low profiles, and as a consequence, having side doors with lowermost parts that are placed at extremely short distances from the ground. Consequently, there is a continued need to provide arrangements that allow doors, in particular side doors, of road vehicles to open without being damaged as a result of hitting a curb.

SUMMARY

In view of the above, an object of the present disclosure is to overcome or at least mitigate at least some of the drawbacks related to doors of road vehicles.

This is achieved in a first aspect by a door hinge for connecting a side door of a road vehicle to the body of the road vehicle. The door hinge has a closed state in which the side door is closed and an open state in which the side door is open. The door hinge comprises a door mount for connecting the door hinge to the side door, and a base or frame for mounting the door hinge to the body of the road vehicle in a mounting orientation. A coupler is connected the door mount, and a crank is pivotally connected to the base by a first joint and to the coupler by a second joint. A follower is pivotally connected to the base by a third joint and to the coupler by a fourth joint.

The base, coupler, crank, and follower are arranged to shift the door mount, or the side door, in outward movement relative to the base in its mounting orientation, or relative to the body of the road vehicle, at a change of the state of the door hinge from closed to open. The coupler is connected to the door mount by a fifth joint, wherein the fifth joint is a revolute joint arranged to allow a rotation of the door mount relative to the coupler that is transverse to the outward movement. A gear mechanism connects the door mount and the crank and is arranged to rotate the door mount relative to the coupler at a change of the state of the door hinge from closed to open.

In terms of weight carrying capacity, embodiments of the door hinge include those where it is configured to carry a side door having a weight in the range 10 kg to 100 kg.

The first joint may be a revolute joint that is arranged or oriented to shift the door mount or the side door in upward movement relative to the base in its mounting orientation, or to the body of the road vehicle, when going from the closed state to the open state.

The first joint may be a revolute joint defining a first axis of rotation that is tilted away from the door mount with the door hinge in its open state and the base in its mounting orientation.

In other words, in various aspects, such a door hinge provides a technical effect that the side door of the road vehicle, when it is being opened, is shifted upwards while at the same time it shifts in an outward direction and rotates in a plane that is transverse to the outward direction. An advantage of such a technical effect is a decreased risk of the lowermost parts of the side door hitting, e.g., a roadside curb and, consequently, expensive repairing of damages to the road vehicle can be avoided.

In some embodiments, the base, coupler, crank, and follower are further arranged to cause an angular change between the coupler and the crank at a change of the state of the door hinge from closed to open. In such embodiments, the gear mechanism comprises a plurality of first cogs attached to the door mount and a plurality of second cogs attached to the crank. The first cogs and the second cogs are arranged to cooperate and rotate the door mount relative to the coupler at the angular change between the coupler and the crank.

In other words, such embodiments provide a simple and compact arrangement that provides the rotation of the side door when it is being opened.

In some embodiments, the second joint is a revolute joint defining a second axis of rotation that is tilted away from the base with the door hinge in its closed state and the base in its mounting orientation.

That is, such a tilted second axis of rotation has an effect of maintaining the side door in a substantially vertical plane when it is being opened and, naturally, maintaining the verticality also while the side door remains open. An advantage of such an effect is that it minimizes the load on the door hinge itself and the load on the body of the vehicle because of the center of gravity of the side door is aligned with the hinge.

A mechanical linkage of the base, coupler, crank, and follower may, in some embodiments, define a double-rocker motion at a change of the state of the door hinge from closed to open. Such a mechanical linkage may be obtained by the first and third joints being spaced apart on the base, and the second and fourth joints being spaced apart on the coupler. For example, the separation between the centers of the first and third joints may be greater than the separation between the centers of the second and fourth joints, and the separation between the centers of the first and second joints may be greater than the separation between the centers of the third and fourth joints.

An advantage of such mechanical linkage is that it is a simple and compact construction.

The door hinge may comprise a damper, and, in some embodiments, it may comprise an actuator. The damper, e.g. a linear damper, may be connected by a sixth joint to the base and a seventh joint to the crank and arranged to dampen relative movement between the base and the crank at a change of the state of the door hinge from open to closed. The actuator may be connected by an eighth joint to the base and a ninth joint to the crank and configured to change the state of the door hinge from closed to open.

An advantage of such embodiments is that they are simple and compact constructions that enable easy and safe opening and closing of the side door.

In a second aspect, the above object is also achieved by a road vehicle comprising a body, a side door, and a door hinge according to the first aspect, wherein the door hinge connects the side door of the road vehicle to the body of the road vehicle.

DETAILED DESCRIPTION

Figure 1:
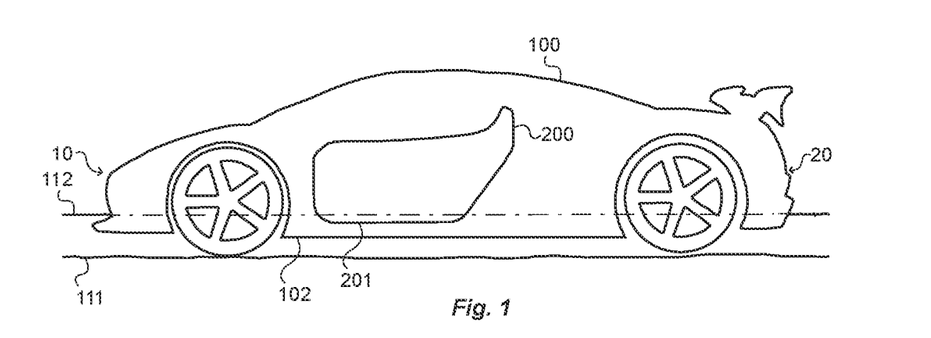
FIG. 1 schematically illustrate a left view of a road vehicle comprising a side door.

Referring first to FIG. 1, a low-riding road vehicle 100 is schematically illustrated in a view from the left, having a front part 10 and a back part 20 and a side door 200. The road vehicle 100 is standing still and is parked on a part of the ground 111 by a curb 112 that may be a part of a sidewalk or pavement. It can be readily appreciated that the side door 200 is in danger of being subject to more or less severe damage when opened. As FIG. 1a schematically illustrates, due to the fact that the side door 200 has a lowermost edge 201 that is below the height of the curb 112, the lowermost edge 201 may hit the curb 112 when the side door 200 moves or swings outward, i.e. in a general direction perpendicular to the plane of FIG. 1.

Figure 2A:
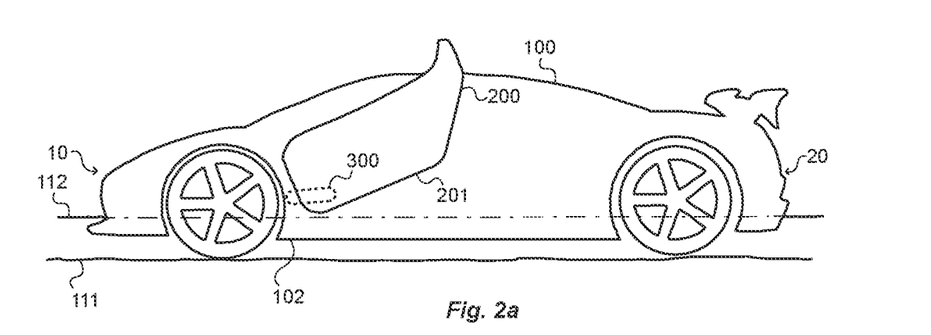
FIGS. 2a and 2b schematically illustrate a left side view of a road vehicle during a sequence of opening a side door.
Figure 2B:
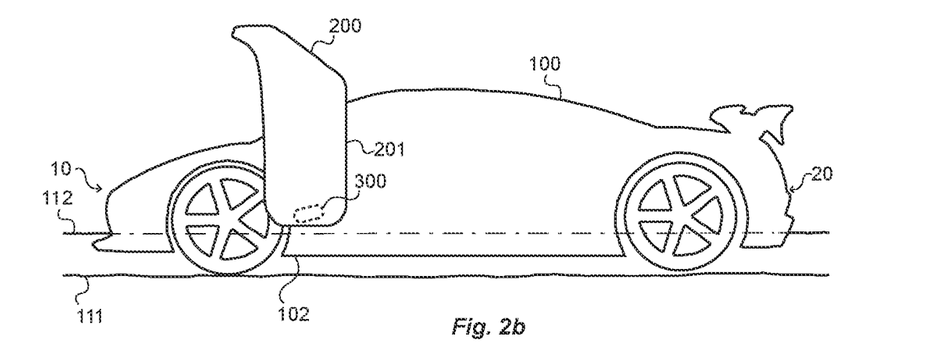

FIG. 2a and FIG. 2b illustrate a sequence where the side door 200, connected to the road vehicle 100 by means of a door hinge 300, is being opened, as a consequence of which the door hinge 300 changes state from a closed to an open state. In FIG. 2a, the door 200 is in a semi-open state in which it has shifted upwards and outwards in a direction perpendicular to the plane of FIG. 2a, while also having been rotated in a plane that is transverse to the outward direction. FIG. 2b illustrates the door 200 being in an open state where it has shifted further upwards and outwards and rotated further to a position that provides maximum clearance for a passenger when getting out of the road vehicle 100.

Embodiments of the door hinge 300 will now be described in some detail with reference to FIGS. 3a-h and with continued reference to FIGS. 1 and 2a-b.

The door hinge comprises a door mount 302 for connecting the door hinge 300 to the side door 200. A base 304 is provided for mounting the door hinge 300 to the body 102 of the road vehicle 100 in a mounting orientation. The base 304 may be in the form of a frame and, as is most clearly illustrated in the view from the front 10 in FIGS. 3c-d, such a base or frame may have an appropriate design in order to enable a secure attachment of the hinge 300 to the body 102 of the road vehicle 100.

A coupler 306 is connected the door mount 302, and a crank 308 is pivotally connected to the base 304 by a first joint 310. The crank 308 is connected to the coupler 306 by a second joint 312.

Figure 3A:
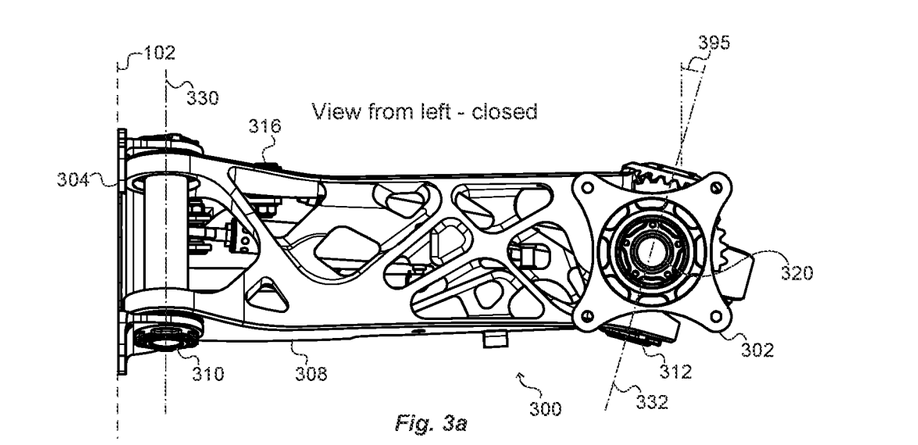
FIGS. 3a and 3b are views from the left side of a door hinge in a closed state and an open state, respectively.
Figure 3B:
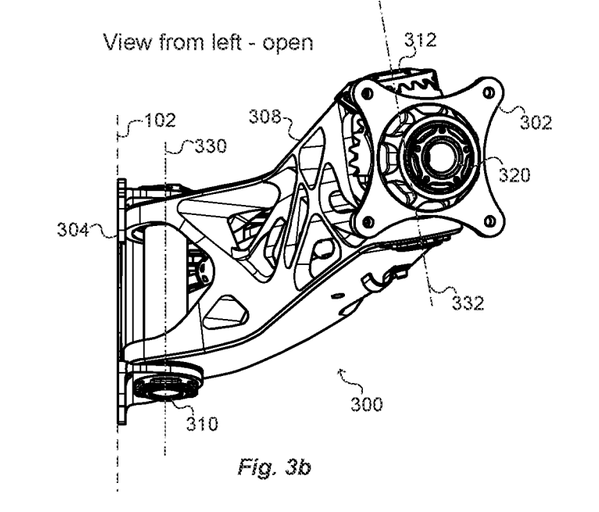
Figure 3C:
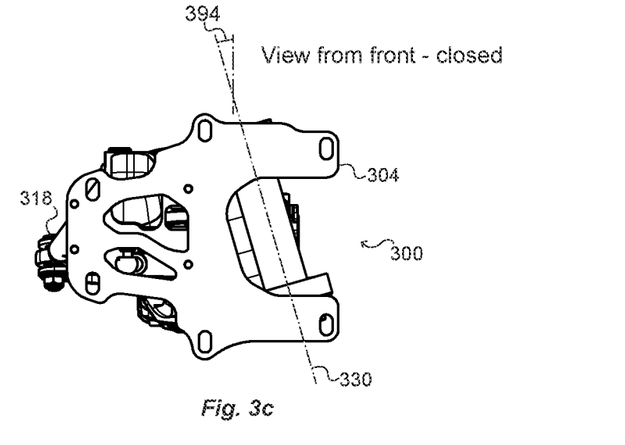
FIGS. 3c and 3d are views from the front of a door hinge in a closed state and an open state, respectively.
Figure 3D:
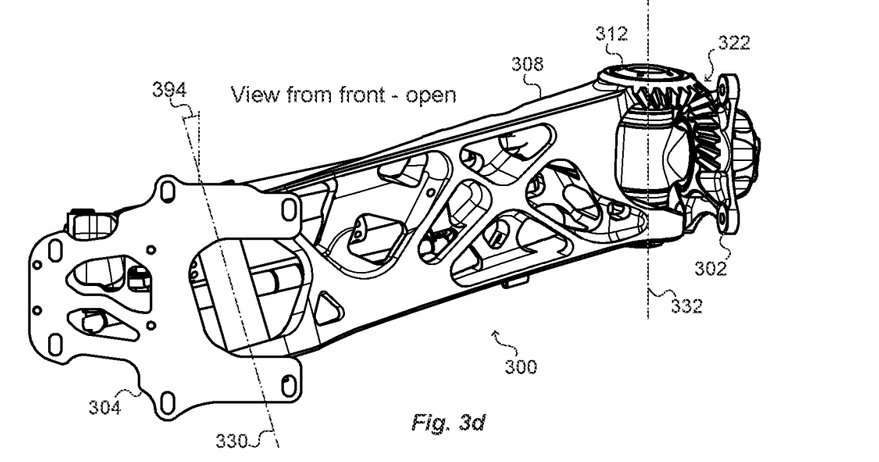

As is clearly illustrated in FIGS. 3c and 3d, the first joint 310 may be a revolute joint defining a first axis of rotation 330 that is tilted away from the door mount 302 with the door hinge 300 in its open state and the base 304 in its mounting orientation. In various embodiments, the first axis of rotation 330 is tilted away from the door mount 302 by an angle 394 to the vertical in the range 5° to 25°, or 10° to 20°. In other words, such a first, revolute, joint 310 is arranged or oriented to shift the door mount 302, and thereby shifting the door 200 when attached to the door mount 302, in upward movement relative to the base 304 in its mounting orientation, and thereby relative to the body 102 of the road vehicle 100 when attached to the body 102, when going from the closed state to the open state.

A follower 314 is pivotally connected to the base 304 by a third joint 316, e.g. a spherical joint, and connected to the coupler 306 by a fourth joint 318, e.g. a spherical joint.

The base 304, coupler 306, crank 308, and follower 314 are arranged to shift the door mount 302, and thereby shifting the door 200 when attached to the door mount 302, in an outward movement relative to the base 304 in its mounting orientation, and thereby relative to the body 102 of the road vehicle 100 when attached to the body 102, at a change of the state of the door hinge 300 from closed to open.

The coupler 306 is connected to the door mount 302 by a fifth joint 320. The fifth joint 320 is a revolute joint arranged to allow a rotation of the door mount 302 relative to the coupler 306 that is transverse to the outward movement.

A gear mechanism 322 connects the door mount 302 and the crank 308, and the gear mechanism 322 is arranged to rotate the door mount 302 relative to the coupler 306 at a change of the state of the door hinge 300 from closed to open.

Figure 3E:
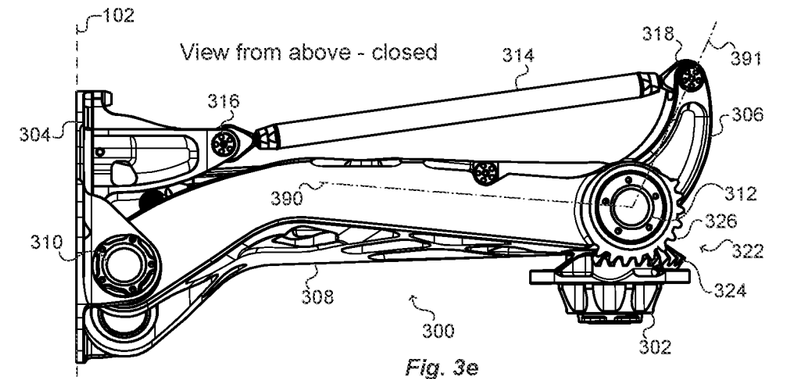
FIGS. 3e and 3f are views from above of a door hinge in a closed state and an open state, respectively.
Figure 3F:
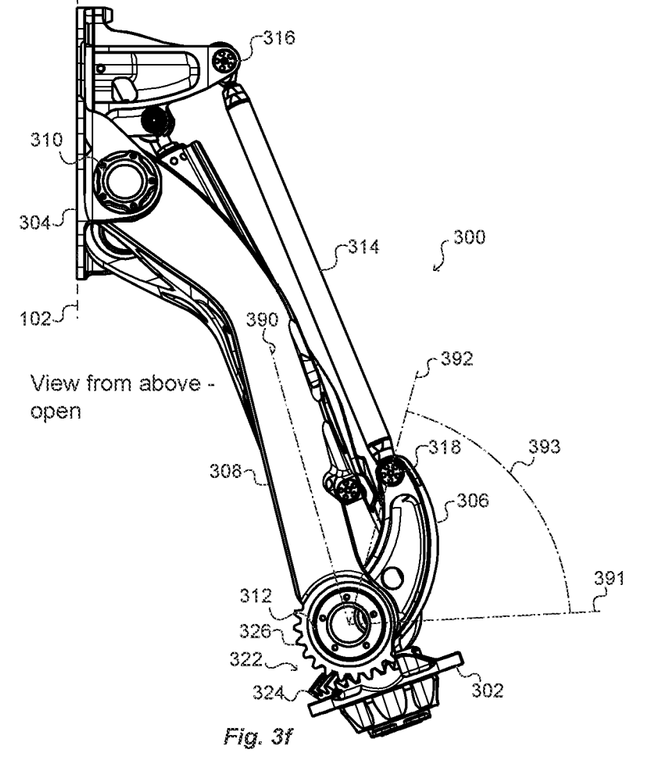

As is clearly illustrated in FIGS. 3e and 3f, the base 304, coupler 306, crank 308, and follower 314 may further be arranged to cause an angular change 393 between the coupler 306 and the crank 308 at a change of the state of the door hinge 300 from closed to open. Embodiments include those where, as illustrated, the gear mechanism 322 comprises a plurality of first cogs 324 attached to the door mount 302 and a plurality of second cogs 326 attached to the crank 308. For example, the first cogs 324 and second cogs 326 may be in the form of a bevel gear, or a portion of a bevel gear. In such embodiments, the first cogs 324 and the second cogs 326 are arranged to cooperate and rotate the door mount 302 relative to the coupler 306 at the angular change 393 between the coupler 306 and the crank 308.

As is clearly illustrated in FIGS. 3a and 3b, the second joint 312 may be a revolute joint defining a second axis of rotation 332 that is tilted away from the base 304 with the door hinge 300 in its closed state and the base 304 in its mounting orientation. For example, the second axis of rotation 332 may be tilted away from the base 304 by an angle 395 to the vertical in the range 5° to 25°, or 10° to 20° with the door hinge 300 in its closed state and the base 304 in its mounting orientation. In such embodiments of the door hinge 300, the tilted second axis of rotation 332 has an effect of maintaining the side door 200, when attached to the door mount 302, in a substantially vertical plane when it is being opened and maintaining the verticality also while the side door 200 is open, e.g. as illustrated in FIG. 2b.

As is clearly illustrated in FIGS. 3e and 3f, a mechanical linkage defining a double-rocker motion at a change of the state of the door hinge 300 from closed to open may be constituted by the base 304, the coupler 306, the crank 308, and the follower 314. Such a mechanical linkage may be obtained in embodiments where the first and third joints 310, 316 are spaced apart on the base 304, and the second and fourth joints 312, 318 are spaced apart on the coupler 306. For example, the separation between the centers of the first and third joints 310, 316 may be greater than the separation between the centers of the second and fourth joints 312, 318, and the separation between the centers of the first and second joints 310, 312 may be greater than the separation between the centers of the third and fourth joints 316, 318.

Figure 3G:
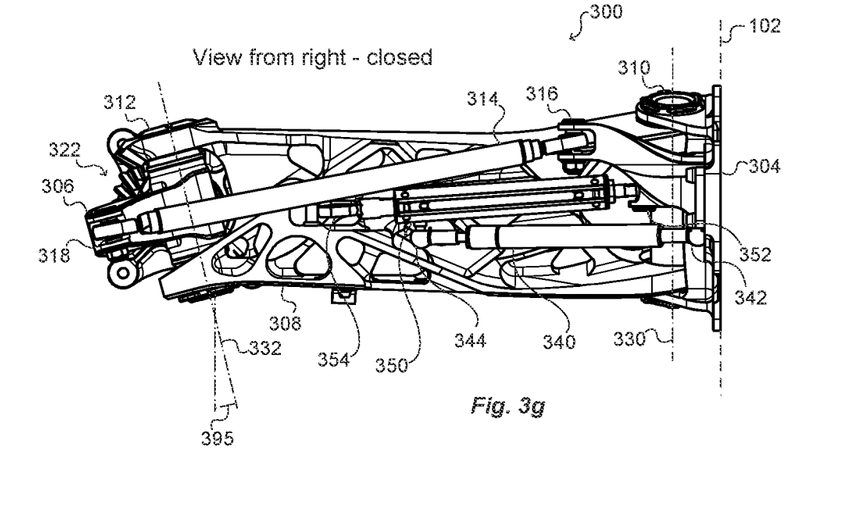
FIGS. 3g and 3h are views from the right side of a door hinge in a closed state and an open state, respectively.
Figure 3H:
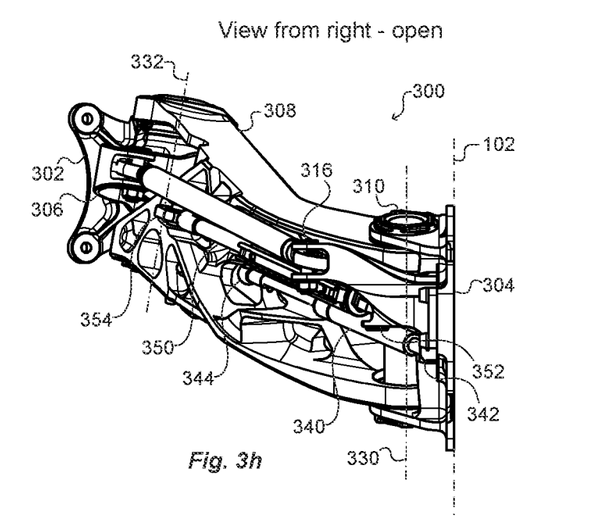

As is clearly illustrated in FIGS. 3g and 3h, embodiments of the door hinge 300 may comprise a damper 340 and/or an actuator 350. The damper 340 may be connected by a sixth joint 342, e.g. a spherical joint, to the base 304 and connected by a seventh joint 344, e.g. a spherical joint, to the crank 308. Such a damper 340 may be arranged to dampen relative movement between the base 304 and the crank 308 at a change of the state of the door hinge 300 from open to closed. The actuator 350 may be connected by an eighth joint 352, e.g. a spherical joint, to the base 304 and a ninth joint 354, e.g. a spherical joint, to the crank 308. Such an actuator 350 may be configured to change the state of the door hinge 300 from closed to open. For example, as is the case in the embodiment illustrated in FIGS. 3g and 3h, the damper 340 and/or the actuator 350 may be of a linear type, and the actuator 350 may be supplied, although not shown in FIGS. 3g and 3h, by power in an appropriate form.

Embodiments of the door hinge 300 are configured such that it is able to carry a side door 200 having a weight in the range 10 kg to 100 kg. That is, by appropriate selection of materials and absolute dimensions of the various elements, the door hinge 300 is capable of securely carrying and switching a door 200 weighing between 10 and 100 kg from a closed state to an open state.

The invention claimed is:

1. A door hinge for connecting a side door of a road vehicle to a body of the road vehicle, wherein the door hinge has a closed state in which the side door is closed and an open state in which the side door is open, the door hinge comprising:
    a door mount configured to connect the door hinge to the side door;
    a base configured for mounting the door hinge to the body of the road vehicle in a mounting orientation;
    a coupler connected to the door mount;
    a crank pivotally connected to the base by a first joint and to the coupler by a second joint; and
    a follower pivotally connected to the base by a third joint and to the coupler by a fourth joint;
    wherein the base, the coupler, the crank, and the follower are arranged to shift the door mount in outward movement relative to the base in its mounting orientation at a change of the state of the door hinge from closed to open;
    wherein the coupler is connected to the door mount by a fifth joint;
    wherein the fifth joint is a revolute joint arranged to allow a rotation of the door mount relative to the coupler that is transverse to the outward movement; and
    wherein the door hinge further comprises:
    a gear mechanism connecting the door mount and the crank and arranged to rotate the door mount relative to the coupler at a change of the state of the door hinge from closed to open.

2. The door hinge according to claim 1, wherein:
    the first joint is a revolute joint arranged to shift the door mount in upward movement relative to the base in its mounting orientation when the door changes from the closed state to the open state.

3. The door hinge according to claim 1, wherein:
    the first joint is a revolute joint defining a first axis of rotation that is tilted away from the door mount with the door hinge in its open state and the base in its mounting orientation.

4. The door hinge according to claim 3, wherein:
    the first axis of rotation is tilted away from the door mount by an angle to the vertical in the range 5° to 25°.

5. The door hinge according to claim 1, wherein:
    the base, the coupler, the crank, and follower are further arranged to cause an angular change between the coupler and the crank at a change of the state of the door hinge from closed to open; and
    the gear mechanism comprises a plurality of first cogs attached to the door mount and a plurality of second cogs attached to the crank, wherein the first cogs and the second cogs are arranged to cooperate and rotate the door mount relative to the coupler at the angular change between the coupler and the crank.

6. The door hinge according to claim 5, wherein:
    the first cogs and the second cogs form at least a portion of a bevel gear.

7. The door hinge according to claim 1, wherein:
    the second joint is a revolute joint defining a second axis of rotation that is tilted away from the base with the door hinge in its closed state and the base in its mounting orientation.

8. The door hinge according to claim 7, wherein:
    the second axis of rotation is tilted away from the base by an angle to the vertical in the range 5° to 25° with the door hinge in its closed state and the base in its mounting orientation.

9. The door hinge according to claim 1, wherein:
the base, the coupler, the crank, and the follower constitute a mechanical linkage defining a double-rocker motion at a change of the state of the door hinge from closed to open.

10. The door hinge according to claim 1, wherein:
the first joint and the third joint are spaced apart on the base, and the second joint and the fourth joint are spaced apart on the coupler.

11. The door hinge according to claim 10, wherein each of the first, second, third, and fourth joints has a center, and wherein the centers of the first joint and the third joint are separated by a first separation, and the centers of the second joint and the fourth joint are separated by a second separation, wherein the first separation is greater than the second separation.

12. The door hinge according to claim 1, wherein each of the first, second, third, and fourth joints has a center, and wherein the centers of the first joint and the second joint are separated by a first separation, and the centers of the third joint and the fourth joint are separated by a second separation, wherein the first separation is greater than the second separation.

13. The door hinge according to claim 1, further comprising:
a damper connected by a sixth joint to the base and by a seventh joint to the crank, and arranged to dampen relative movement between the base and the crank at a change of the state of the door hinge from open to closed.

14. A road vehicle comprising a body having a side door connected to the body by a door hinge, wherein the door hinge comprises:
a door mount configured to connect the door hinge to the side door;
a base configured for mounting the door hinge to the body of the road vehicle in a mounting orientation;
a coupler connected to the door mount;
a crank pivotally connected to the base by a first joint and to the coupler by a second joint; and
a follower pivotally connected to the base by a third joint and to the coupler by a fourth joint;
wherein the base, the coupler, the crank, and the follower are arranged to shift the door mount in outward movement relative to the base in its mounting orientation at a change of state of the door hinge from closed to open;
wherein the coupler is connected to the door mount by a fifth joint;
wherein the fifth joint is a revolute joint arranged to allow a rotation of the door mount relative to the coupler that is transverse to the outward movement; and
wherein the door hinge further comprises:
a gear mechanism connecting the door mount and the crank and arranged to rotate the door mount relative to the coupler at the change of state of the door hinge from closed to open.

15. The road vehicle according to claim 14, wherein:
the first joint is a revolute joint arranged to shift the door mount in upward movement relative to the base in its mounting orientation when the door changes from the closed state to the open state.

16. The road vehicle according to claim 14, wherein:
the first joint is a revolute joint defining a first axis of rotation that is tilted away from the door mount with the door hinge in its open state and the base in its mounting orientation.

17. The road vehicle according to claim 16, wherein:
the first axis of rotation is tilted away from the door mount by an angle to the vertical in the range 5° to 25°.

18. The road vehicle according to claim 14, wherein:
the base, the coupler, the crank, and follower are further arranged to cause an angular change between the coupler and the crank at a change of the state of the door hinge from closed to open; and
the gear mechanism comprises a plurality of first cogs attached to the door mount and a plurality of second cogs attached to the crank, wherein the first cogs and the second cogs are arranged to cooperate and rotate the door mount relative to the coupler at the angular change between the coupler and the crank.

19. The road vehicle according to claim 18, wherein:
the first cogs and the second cogs form at least a portion of a bevel gear.

20. The road vehicle according to claim 14, wherein:
the second joint is a revolute joint defining a second axis of rotation that is tilted away from the base with the door hinge in its closed state and the base in its mounting orientation.

21. The road vehicle according to claim 20, wherein:
the second axis of rotation is tilted away from the base by an angle to the vertical in the range 5° to 25° with the door hinge in its closed state and the base in its mounting orientation.

22. The road vehicle according to claim 14, wherein:
the base, the coupler, the crank, and the follower constitute a mechanical linkage defining a double-rocker motion at a change of the state of the door hinge from closed to open.

23. The road vehicle according to claim 14, wherein:
the first joint and the third joint are spaced apart on the base, and the second joint and the fourth joint are spaced apart on the coupler.

24. The road vehicle according to claim 23, wherein each of the first, second, third, and fourth joints has a center, and wherein the centers of the first joint and the third joint are separated by a first separation, and the centers of the second joint and the fourth joint are separated by a second separation, wherein the first separation is greater than the second separation.

25. The road vehicle according to claim 14, wherein each of the first, second, third, and fourth joints has a center, and wherein the centers of the first joint and the second joint are separated by a first separation, and the centers of the third joint and the fourth joint are separated by a second separation, wherein the first separation is greater than the second separation.

* * * * *